Nov. 11, 1969  P. KLAMP  3,477,388
ENTRANCE SWITCH FOR POWER AND FREE CONVEYORS
Filed March 3, 1966  3 Sheets-Sheet 1

INVENTOR.
PAUL KLAMP
BY
Barnes, Kisselle, Raisch & Choate
ATTORNEYS

Nov. 11, 1969   P. KLAMP   3,477,388
ENTRANCE SWITCH FOR POWER AND FREE CONVEYORS
Filed March 3, 1966   3 Sheets-Sheet 2

INVENTOR.
PAUL KLAMP
BY
ATTORNEYS

Nov. 11, 1969  P. KLAMP  3,477,388
ENTRANCE SWITCH FOR POWER AND FREE CONVEYORS
Filed March 3, 1966  3 Sheets-Sheet 3

INVENTOR.
PAUL KLAMP
BY
Barnes, Kisselle, Raisch & Choate
ATTORNEYS

United States Patent Office 3,477,388
Patented Nov. 11, 1969

3,477,388
ENTRANCE SWITCH FOR POWER AND
FREE CONVEYORS
Paul Klamp, St. Clair Shores, Mich., assignor, by mesne
assignments, to American Chain & Cable Company,
Inc., New York, N.Y., a corporation of New York
Filed Mar. 3, 1966, Ser. No. 531,477
Int. Cl. B61j 1/06; E01b 25/26; B61k 1/02
U.S. Cl. 104—96                                   20 Claims

ABSTRACT OF THE DISCLOSURE

A power and free conveyor system having a main line including a main continuously driven conveyor, a spur line merging with the main line, and a transfer conveyor at the area of juncture of the spur line and main line. Means are provided for holding a carrier in a first position on the spur line out of the path of the transfer conveyor, moving the carrier to a second position in the path of the transfer conveyor and holding it in said second position for release to the transfer conveyor when a carrier is absent on the main conveyor.

---

This invention relates to entrance switches for power and free conveyor systems and particularly to feeders for delivering a carrier which is waiting in a stop position on a spur line connected to the main power and free line.

In power and free conveyors, it is conventional to utilize a transfer conveyor chain driven from the main line conveyor or chain to engage a pusher dog on the trolley of a carrier to feed the carrier to the main line chain. In the waiting position, the pusher dog on the trolley of the carrier or on the front trolley of a multi-trolley carrier is just out of reach of the pusher dogs of a continuously traveling transfer chain which is slave driven from the main line and moves a carrier from the spur line into an open position on the main line. When such a condition occurs, that is if a carrier is waiting in the stop position and an open place on the main line exists for it, a feeder is used to move the carrier forward at the right moment into the path of the corresponding transfer or slave chain pusher dog.

Air feeders of this type are known in which the air feeder simply gives the carrier a push so that it enters the path of the slave chain ahead of the slave chain dog which, after coming around a turn, catches up with the trolley and latches in place between the trolley pusher and hold-back dogs in a known manner. Such a device is not suitable, however, if the carriers are closely spaced on the main conveyor line, requiring a carrier from the spur line to be fed into an open space on the main line with accurate timing. The reason is as follows: On a larger conveyor system with many entrance switches, frequently an air feeder has just pushed a carrier forward at a moment when the conveyor chain comes to a stop. This carrier will now coast forward along the slave chain path and the load suspended from it will collide into the side of the load on the stationary carrier which is one space downstream from the open space. When loads are heavy, such collision will cause damage to the parts carried on the conveyor as well as to the carriers. Therefore, this type of air feeder is limited to installations where the carriers are widely spaced.

Another known type of air feeder of a similar nature is arranged to feed the carrier into slave chain engagement from behind. First the slave chain pusher dog to be used travels around the turn and into the path of the conveyor rails of the spur line. The carrier is then pushed along by the air feeder at a speed greater than that of the slave chain so that the trolley pusher dogs will overtake the slave chain dog until they latch into position on this dog. Such an arrangement has given trouble when used for higher speed conveyors with closely spaced carriers on the main line, because occasionally the load on the carrier in the waiting position is swinging backward, after forward swing caused by stopping the carrier, at the time when the air feeder goes into action. This backward swinging offers additional resistance to the air feeder force needed to accelerate the carrier. As a result, the feed motion is slowed down somewhat and the trolley pusher dogs fail to overtake the slave chain pusher dog. The position control of the carrier is thus lost. It either coasts forward into collision with a carrier on the main line or is overtaken by the slave chain pusher dog which trails the intended one and is pushed into the main line out of controlled position, thus causing collision and jamming between carrier loads. Therefore, this type of feeder is also limited to conveyors with widely spaced carriers where an error of several feet of feeding onto the main line is permissible, as long as the carrier is fed into the main line well ahead of the pusher dog which is to propel it along the main line.

It is therefore an object of this invention to provide a simple and inexpensive means of producing the required carrier motion which is universally adaptable for moving a carrier from a waiting position outside of the path of a slave chain into the path of this chain, ahead of a dog propelled by this chain, without encountering the difficulties outlined above.

Another object of the invention is to provide an air feeder of a novel design in which *two* carrier waiting positions are provided instead of one. The first waiting position is located so that the slave chain dogs just miss the trolley dogs of the carrier. The second waiting position is a short distance forward from the first, where the trolley dogs of the carrier are in the path of the slave chain dogs. The advance of the carrier from the first to the second positions takes place while the slave chain dog is approaching around the turn, coming in from behind the trolley pusher dogs of the carrier. At the second waiting position, the slave chain dog engages the stationary carrier for further travel.

Another important object of the invention is to provide an apparatus to positively stop and hold the carrier in the second waiting position until the slave chain dog overtakes the waiting carrier to move it ahead to the main conveyor line.

Still another object of the invention is to provide an apparatus wherein all parts for stopping the carrier, advancing it, stopping it again and releasing it are powered by one cylinder.

A further object of the invention is the provision of a safety device which prevents jamming of the main power and free conveyor in case of malfunction of the feeder controls.

Figure 1:
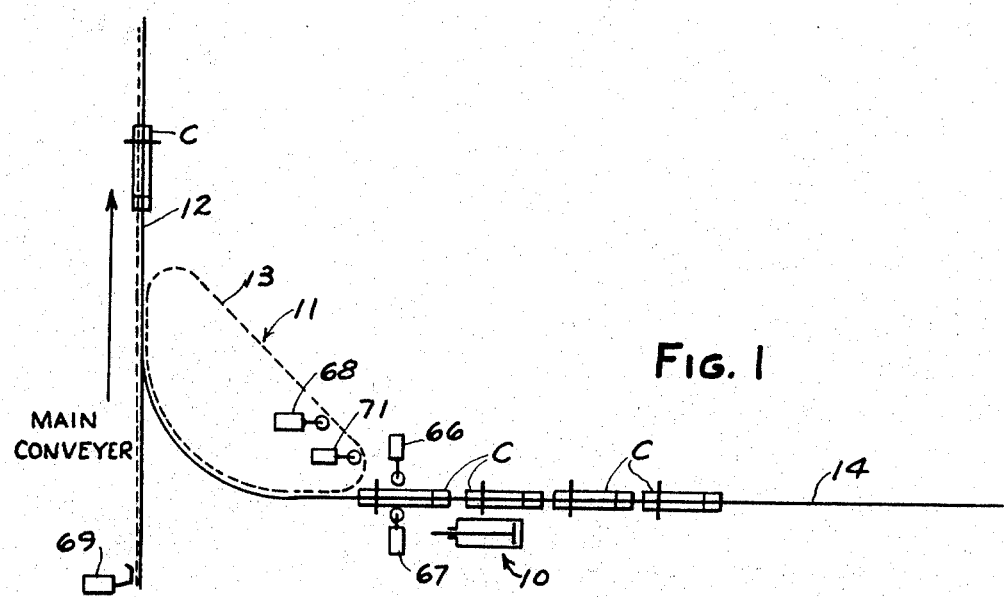
FIG. 1 is a diagrammatic plan view of an entrance switch embodying the invention.

Referring to FIG. 1, the system embodying the invention comprises an entrance switch 11 which is adapted to deliver carriers C from a spur or branch line 14 to a main line 12. The carrier is engaged and moved into position by a feeder 10 for engagement by a pusher dog on the transfer or slave chain 13 which is driven continuously in synchronism with the chain of the main conveyor in a manner such as shown in Klamp Patent 2,868,139.

Figure 3:
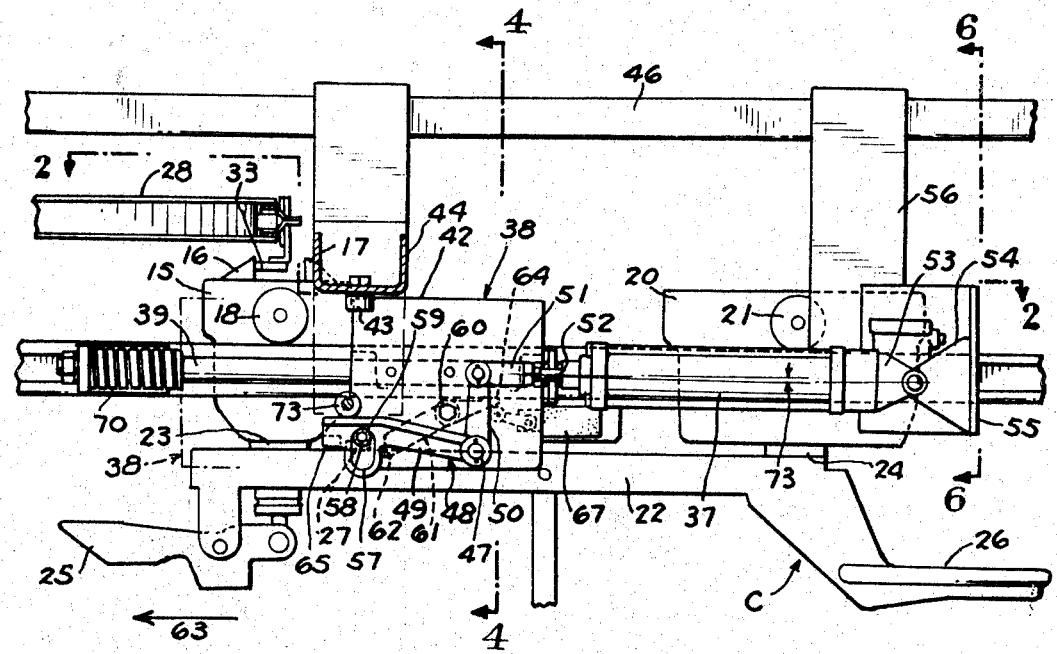
FIG. 3 is a part sectional side elevational view of the apparatus shown in FIG. 2.

Referring to FIG. 3, the carrier comprises a front trolley 15 and a rear trolley 20 connected by a load bar 22. Front trolley 15 has a hinged pusher dog 16 and hold back dog 17 and has running wheels 18. Trolley 15 has the usual two side guide wheels (not shown) which ride between the two free trolley tracks 19 (FIG. 4).

The rear trolley 20 is similar, except that it has no pusher dogs. It runs on wheels 21 and has the same type of side guide wheels as the front trolley. The load bar 22 which carries the work (not shown) is pivoted to the front and rear trolleys at axes 23 and 24, respectively, to permit travel around turns. The carrier shown has accumulation members 25 (front) and 26 (rear) of known construction, where member 25 of an approaching carrier rides up on the rear member 26 of a preceding stationary carrier to pull the pusher dog 16 of the approaching carrier downward, clear of the conveyor chain dog. The invention is also suitable for carriers without this accumulation feature.

Figure 2:
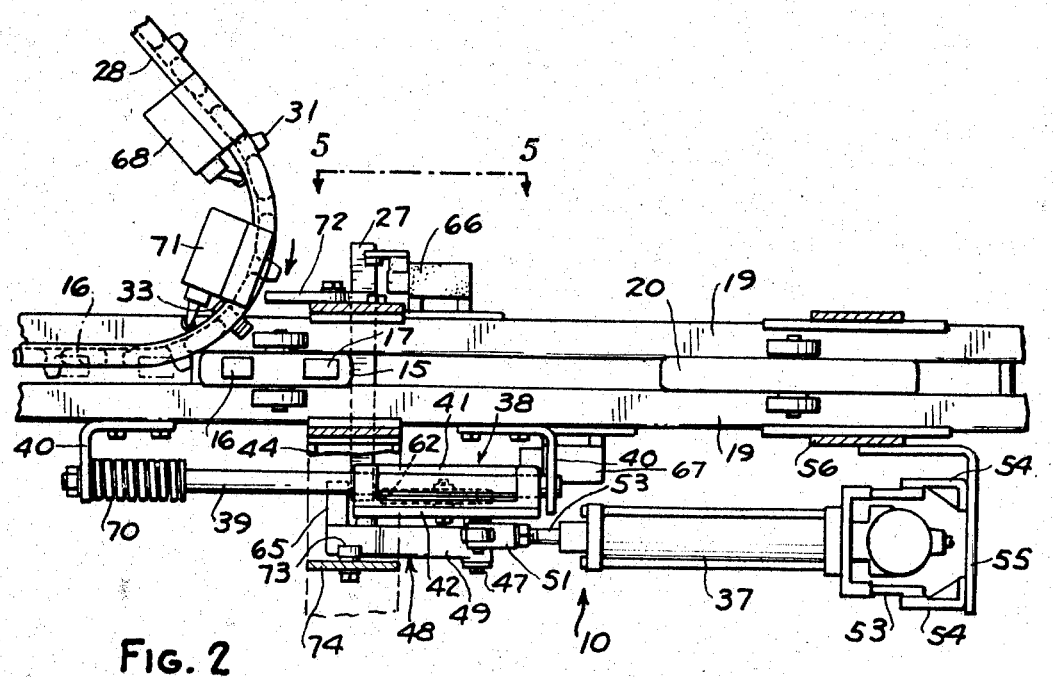
FIG. 2 is a part sectional fragmentary plan view taken along the line 2—2 in FIG. 3.

Fastened to the load bar 22 is a cross bar 27. This cross bar 27 is shown in FIGS. 3, 4 and 5 and is also indicated in FIG. 2, although the rest of the carrier is not shown in FIG. 2. This cross bar 27 serves to effect and control the advance of the carrier from the first to the second waiting position as presently described.

Figure 4:
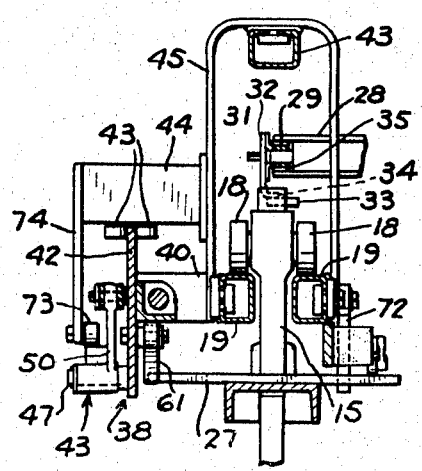
FIG. 4 is a fragmentary sectional view taken along the line 4—4 in FIG. 3.
Figure 5:
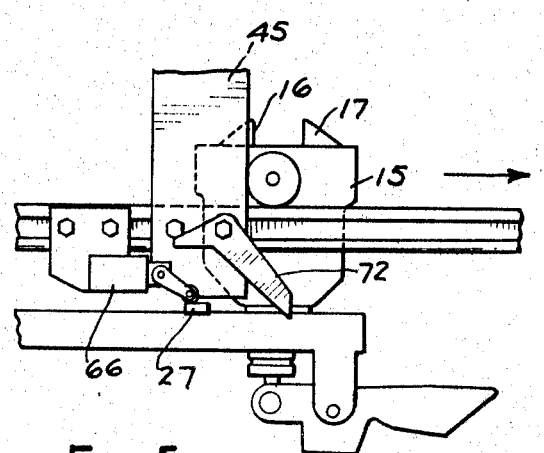
FIG. 5 is an elevational view taken along the line 5—5 in FIG. 2.
Figure 6:
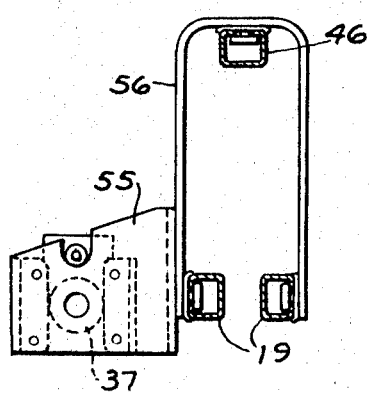
FIG. 6 is a fragmentary sectional view taken along the line 6—6 in FIG. 3.

The slave chain track 28 is U-shaped in cross section as seen in FIG. 4. Riding inside is a roller chain 29. On each fourth link, the inner side bars 30 are extended to one side and bent to form caterpillar teeth 31 which are driven by the main conveyor chain. At one or several places, the inner side bars 30, half way between two caterpillar teeth, are bent to form attachments 32 to which the trolley pusher dogs 33 are welded with an intermediate angle 34.

The outer side bars 35 at the bottom of the chain are of increased thickness so that the lower chain pin heads are each set in a counter bored hole, thus providing a flat riding surface.

Mounting brackets (not shown) are utilized to hold the slave chain track in position and for supporting the power line and free trolley tracks.

The feeder 10 consists of the air cylinder 37 and a reciprocating carriage 38. This carriage 38 is reciprocably mounted on a cylindrical shaft 39 supported on two brackets 40 which are bolted to one side of the trolley tracks 19. A non-ferrous slide 41 rides on shaft 39 and a plate 42 is bolted thereto. The upper edge of this plate 42 is guided between two rollers 43 so that the assembly of slide 41 and plate 42 cannot rotate around shaft 39. The rollers 43 are mounted on a bracket 44 that is bolted to a yoke 45 which straddles the carrier tracks 19 and an upper stiffening rail 46 to tie the track structure together. A stud 47 welded to plate 42 serves as a hinge mounting for a bell crank 48 which has a horizontal arm 49 and a vertical arm 50. A clevis 51 is fastened to the end of piston rod 52 of air cylinder 37 and is hinged to the vertical arm 50 of bell crank 48. The rear head of the air cylinder 37 is provided with a clevis 53 which is hinged to two brackets 54 that are mounted on an angle 55 which is bolted to a yoke 56.

The horizontal arm 49 of bell crank 48 is provided with a vertically elongated slot 57 through which a stud 58 extends. Stud 58 is covered by a cushioning rubber sleeve 59. Referring to FIGS. 3 and 4, a pusher dog 61 is pivoted at 60 to plate 42. The front end 62 of dog 61 provides the pushing effort against the cross bar 27 of the carrier when the carriage 38 is moved from a first stop or waiting position in which the carrier is shown to a second stop or waiting position in the direction of arrow 63 (FIG. 3). In order to prevent counterclockwise turning of dog 61 when it pushes the carrier, the dog has an upward extension 64 which abuts against the underside of slide 41.

As shown in FIG. 2, the horizontal arm 49 of bell crank 48 has a side or lateral extension 65 which is on the same level as the cross bar 27 of the carrier and causes the latter to stop when the carrier reaches the first stop position. Just before it reaches this position, cross car 27 contacts the underside of dog 61 and lifts it clear for passage. When the cross bar 27 comes in contact with extension 65, the pusher dog 61 is free to drop again to the pushing position shown, so that now the cross bar 27 is trapped between extension 65 and dog 61, thus holding the carrier in the first stop position.

The feeder 10 must not go into operation until a carrier is actually in the first waiting position, a slave chain dog is approaching and an open place is available on the main line. These conditions are electrically sensed as follows by limit switches 66, 67, 68 and 69. When the carrier has reached the first waiting position, the cross bar 27 operates limit switch 66 (FIGS. 1, 2 and 5) and the pusher dog 61 releases limit switch 67 (FIG. 3) after the dog has dropped in behind cross bar 27. Limit switch 68 is operated by an approaching slave chain dog 33 to signal the start of the feeder motion, provided that limit switch 69 (FIG. 1) is not contacted by a passing carrier on the main line 12. If it were contacted during the time that limit switch 68 is operated, the feeder 10 would not operate and feed motion would not take place until an open space appeared on the main line next to limit switch 69 at which time another slave chain dog operates limit switch 68. At this time, the feeder 10 goes into operation with the air cylinder 37 controlled by a solenoid valve advancing the carriage 38 so that the carrier is moved to the second waiting position. When the piston of the cylinder reaches the end of its forward stroke, the slide 41 just contacts a stiff spring 70 on shaft 39 so that the carriage 38 cannot move ahead of its intended end position due to its inertia. If it did, bell crank 48 would turn clockwise at this moment, thus lifting extension 65 clear of the cross bar 27 and allowing the carrier to continue its motion, but it is the express object of the invention to prevent this untimed escape of the carrier. Whereas a solid stop would accomplish the same purpose as spring 70, the latter is employed for safety purposes as presently described.

The carrier is now stopped momentarily in the second waiting position until the slave chain dog 33 which started the feeder motion through limit switch 68 is just about in position to engage the trolley pusher dog 16. At this time, dog 33 operates a limit switch 71 (FIG. 2) in order to retract the feeder carriage 38 by reversing the position of the solenoid operated valve. In order to make doubly sure that the carrier does not accidentally move backwards from its second waiting position, a hinged holdback dog 72 (FIGS. 2 and 5) which was lifted during the advance of the carrier by cross bar 27, drops in behind this cross bar 27 when the carrier reaches the second stop position.

During the first part of the retracting motion of the piston of cylinder 37, the bell crank 48 is turned clockwise to the extent of the space in slot 57. This lifts the extension 65 of the bell crank 48 clear of the carrier cross bar 27 in order to allow retraction of the carriage 38 without pulling the carrier backwards. When this turning motion of the bell crank 48 is completed, further travel of the piston rod causes the carriage 38 to follow. A stationary roller 73 mounted on a plate 74 which is fastened to the bracket 44 comes in contact with the top surface 75 of bell crank 48 during the retracting motion of the carriage, so that the bell crank is turned back to its starting position shown in FIG. 3.

Should the retraction of carriage 38 start too late or not at all due to electrical failure or maladjustment of the position of limit switch 71, the slave chain dog 33 would start to move the carrier forward from the second waiting position without the extension 65 of bell crank 48 being raised. The carrier cross bar 27 would then exert pressure against extension 65, but the latter is yielding because it can move in the direction of carrier travel by pulling pivot 47 and thus carriage 38 forward against the resistance of spring 70. The pivot at the upper end of bell crank arm 64 cannot follow this motion because the piston rod is fully extended. As a result, the bell crank would turn clockwise, thus raising extension 65 as it is pulled forward until it is clear of the cross bar 27. The carrier thus would be moved into the main line without jamming. The air feeder would, of course, need attention to correct the malfunction before it can operate again, but the balance of the conveyor system would remain in operation.

Figure 7:
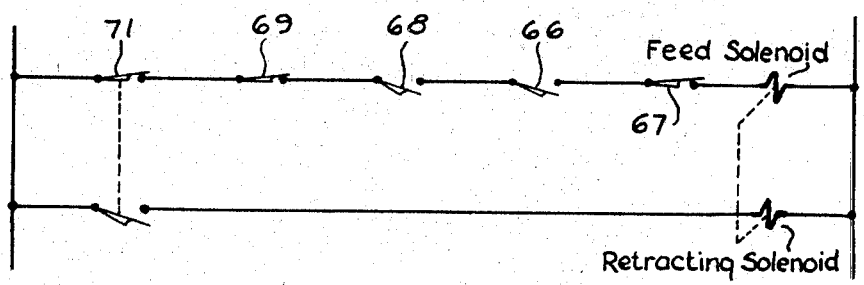
FIG. 7 is a fragmentary wiring diagram.

FIGS. 1 and 7 show the electrical control arrangement. The solenoids indicated in FIG. 7 are of the type which move the valve spool when energized momentarily. The valve spool remains in the shifted position until the opposite solenoid is energized. The spool is moved to the position for feeder advance when the feed solenoid is energized. This happens when all five limit switch contacts in its circuit are closed. Assuming a carrier has arrived in the first waiting position, the contact of limit switch 67 is opened as pusher dog 61 is lifted just before the carrier arrives but closes again as dog 61 drops behind the cross bar 27. Therefore the contact of switch 67 remains closed as long as the carrier is in the first waiting position. The contact of limit switch 66 is also closed now through cross bar 27.

The contact of limit switch 69 remains closed if there is an empty place on the main line at the moment when the slave chain dog 33 operates limit switch 68 to close its contact. Now all contacts for the feed solenoid are closed, causing a shift of the valve spool and the start of the feeder motion. When the carrier has advanced a short distance, limit switch 66 is released by the cross bar 27 and the contact is opened, but the valve spool remains in the shifted position until after the feed motion has been completed at which time the slave chain dog 33 operates limit switch 71, so that its contact for the feed solenoid is opened and its second contact for the retracting solenoid is closed, causing the air feeder to retract to its initial position where it remains until all the contacts for the feed solenoid are closed again. That, of course, requires another carrier to be in the first waiting position and an empty place to be available on the main line.

The movement of the carriers to the first waiting position may be accomplished in one of three ways; first, by manually pushing the carrier, second, by traveling down a slight slope by gravity as in FIG. 3 where the carrier tracks are sloped by the angle 73 and third, by mechanical means whether air operated or motor driven.

Figure 8:
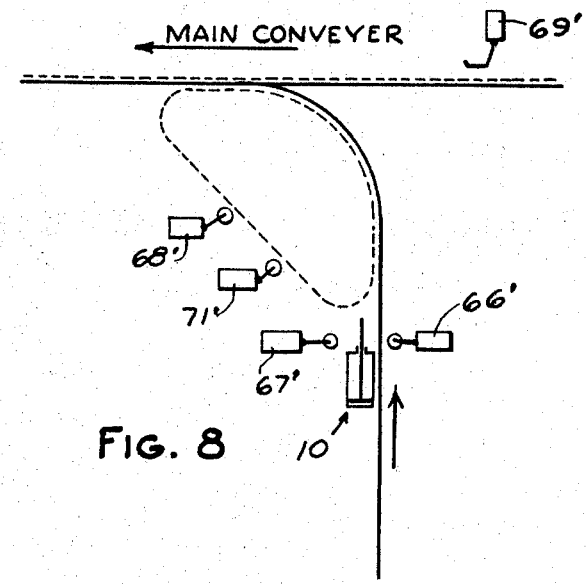
FIG. 8 is a diagram showing the relative positions of the various parts of a modified entrance switch including the limit switches.

As shown diagrammatically in FIG. 1, the entrance switch is adapted to feed a carrier to the right into a main conveyor. It can be appreciated that the various parts of the entrance switch would be positioned in a mirror-like arrangement where the carriers are to be fed to the left to the main conveyor. This is shown in FIG. 8 wherein the various switches are identified as switches 66', 67', 68', 69' and 71', respectively.

It can thus be seen that there has been provided a method and apparatus for moving a carrier positively into position for engagement by a transfer conveyor by positioning carriers successively in two carrier waiting positions, one out of the path of the transfer conveyor and the other in the path of the transfer conveyor.

The apparatus is relatively simple and inexpensive and is constructed to prevent jamming of the main conveyor in case of malfunction of the controls.

I claim:

1. In a power and free conveyor system, the combination comprising
 a main line including a main continuously driven conveyor,
 a spur line merging with the main line,
 a transfer conveyor having pusher dogs thereon at the area of juncture of the spur line and main line,
 means for continuously driving the transfer conveyor in synchronism with the main conveyor,
 and means for holding a carrier in a first position on the spur line out of the path of the transfer conveyor including power means for moving the carrier to a second position in the path of the transfer conveyor.

2. The combination set forth in claim 1 including means for sensing the approach of a pusher dog on the transfer conveyor to release the carrier from the second position.

3. The combination set forth in claim 1 including means for sensing the absence of a carrier on a main conveyor for energizing said means to move the carrier from the first position to the second position.

4. The combination set forth in claim 1 including means for sensing the presence of a carrier at the first position for setting in motion said means for transferring the carrier to a second position only if a carrier is present at the first position.

5. In a power and free conveyor system, the combination comprising
 a main line including a main continuously driven conveyor,
 a spur line merging with the main line,
 a transfer conveyor having pusher dogs thereon at the area of juncture of the spur line and main line,
 means for continuously driving the transfer conveyor in synchronism with the main conveyor,
 and means for holding a carrier in a first position on the spur line out of the path of the transfer conveyor and moving the carrier to a second position in the path of the transfer conveyor,
 said last mentioned means comprising a carriage,
 means on said carriage for engaging a carrier,
 and means for moving said carriage between said first and second positions.

6. The combination set forth in claim 5 wherein said last mentioned means comprises a fluid operated cylinder.

7. In a power and free conveyor system, the combination comprising
 a main line including a main continuously driven conveyor,
 a spur line merging with the main line,
 a transfer conveyor having pusher dogs thereon at the area of juncture of the spur line and main line,
 means for continuously driving the transfer conveyor in synchronism with the main conveyor,
 and means for holding a carrier in a first position on the spur line out of the path of the transfer conveyor and moving the carrier to a second position in the path of the transfer conveyor,
 said last-mentioned means comprising a carriage,
 means on said carriage for engaging a carrier,
 and means for moving said carriage between said first and second positions,
 said carriage including override means operable to release said carrier from said carrier engaging means in the event that a malfunction occurs.

8. The combination set forth in claim 7 wherein said last mentioned means includes a bell crank and spring means engaging and operatively connecting said bell crank to hold said bell crank in carriage holding position.

9. In a power and free conveyor system, the combination comprising
 a main line including a main continuously driven conveyor,
 a spur line merging with the main line,
 a transfer conveyor having pusher dogs thereon at the area of juncture of the spur line and main line, means for continuously driving the transfer conveyor in synchronism with the main conveyor, a carriage, means on said carriage for engaging and holding a carrier, means for supporting said carriage for movement in a direction parallel to said spur line from a first position wherein a carrier is held out of the path of the transfer conveyor to a second position wherein the carrier is held in the path of the transfer conveyor, and means for reciprocating said carriage between said positions.

10. The combination set forth in claim 9 wherein said last mentioned means includes means responsive to the movement of said carriage to said first mentioned position to cause said carrier engaging means to release the carrier.

11. The combination set forth in claim 9 wherein said last mentioned means comprises a bell crank lever pivoted to said carriage and having one end thereof adapted to be normally positioned in advance of a stop member on the carrier, said means for reciprocating said carriage being connected to the other end of said bell crank lever whereby when said carriage reciprocating means is operated to move the carriage from the first position to the second position, said one end of the bell crank lever is maintained in position to retain the carrier against inadvertent movement toward the transfer conveyor and when the reciprocating means is actuated to retract the carriage, the bell crank lever is pivoted to move one end of the bell crank out of the path of the stop member and permit the carrier to be removed from the second position by a pusher dog on the transfer conveyor.

12. The combination set forth in claim 11 including a spring stop engaged by said carriage in the second position whereby in the event of failure of the carriage reciprocating means to retract said carriage, movement of said carriage against the action of the spring stop is permitted sufficient to permit disengagement of said one end of said bell crank from said stop member on said carrier.

13. The combination set forth in claim 11 including means for limiting the pivotal movement of said bell crank lever to said carriage.

14. For use in a power and free conveyor system having a main line including a main continuously driven conveyor, a spur line merging with the main line, a transfer conveyor at the area of juncture of the spur line and main line, and means for continuously driving the transfer conveyor in synchronism with the main conveyor, the improvement comprising means for holding a carrier in a first position on the spur line out of the path of the transfer conveyor, moving the carrier to a second position in the path of the transfer conveyor and holding it in said second position, means for sensing the approach of a pusher member on the transfer conveyor to release the carrier at the second position, means for sensing the absence of a carrier on a main conveyor, and means for sensing the presence of a carrier at the first position for actuating said means to transfer the carrier to a second position only if a carrier is present at the first position and a carrier is absent on the main conveyor.

15. The combination set forth in claim 14 wherein said means for releasing the carrier at the second position is operable in response to movement of said carriage from said second position to said first position.

16. For use in a power and free conveyor system having a main line including a main continuously driven conveyor, a spur line merging with the main line, a transfer conveyor having pusher dogs thereon at the area of juncture of the spur line and main line, means for continuously driving the transfer conveyor in synchronism with the main conveyor, the combination comprising a carriage, means on said carriage for engaging and holding the carrier, means for supporting said carriage adjacent a spur line for movement in a direction parallel to said spur line from a first position wherein a carrier is held out of the path of a transfer conveyor to a second position wherein the carrier is held in the path of the transfer conveyor, and means for reciprocating said carriage between said positions.

17. The combination set forth in claim 16 wherein said last mentioned means includes means responsive to the movement of said carriage to said first mentioned position to cause said carrier engaging means to release the carrier.

18. The combination set forth in claim 16 wherein said last mentioned means comprises a bell crank lever pivoted to said carriage and having one end thereof adapted to be normally positioned in advance of a stop member on the carrier, said means for reciprocating said carriage being connected to the other end of said bell crank lever whereby when said carriage reciprocating means is operated to move the carriage from the first position to the second position, said one end of the bell crank lever is maintained in position to retain the carrier against inadvertent movement and when the reniprocating means is actuated to retract the carriage, the bell crank lever is pivoted to move one end of the bell crank out of the path of the stop member and permit the carrier to be removed.

19. The combination set forth in claim 16 including a spring stop engaged by said carriage in the second position whereby in the event of failure of the carriage reciprocating means to retract said carriage, movement of said carrier against the action of the spring stop is permitted sufficient to permit disengagement of said one end of said bell crank from said stop member on said carrier.

20. In a power and free conveyor system, the combination comprising a first line including a first continuously driven conveyor, a second line merging with the first line, and means for holding a carrier in a first position on the second line out of the path of the conveyor and moving and holding the carrier to a second position in the path of the conveyor.

References Cited

UNITED STATES PATENTS

| 2,868,139 | 1/1959 | Klamp | 104—96 |
| 2,982,227 | 5/1961 | Bishop | 104—96 |
| 2,997,191 | 8/1961 | Finston | 104—96 |
| 3,056,360 | 10/1962 | Burmeister | 104—96 |
| 3,088,419 | 5/1963 | Bishop | 104—178 |

ARTHUR L. LA POINT, Primary Examiner

DANIEL F. WORTH III, Assistant Examiner

U.S. Cl. X.R.

104—130